US009691127B2

(12) United States Patent
Lindskog

(10) Patent No.: US 9,691,127 B2
(45) Date of Patent: Jun. 27, 2017

(54) METHOD, APPARATUS AND COMPUTER PROGRAM PRODUCT FOR ALIGNMENT OF IMAGES

(71) Applicant: Nokia Technologies Oy, Espoo (FI)

(72) Inventor: Alexander Lindskog, Malmo (SE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/896,782

(22) PCT Filed: Jun. 14, 2013

(86) PCT No.: PCT/FI2013/050655
§ 371 (c)(1),
(2) Date: Dec. 8, 2015

(87) PCT Pub. No.: WO2014/199001
PCT Pub. Date: Dec. 18, 2014

(65) Prior Publication Data
US 2016/0180499 A1 Jun. 23, 2016

(51) Int. Cl.
*G06T 3/00* (2006.01)
*G06K 9/62* (2006.01)
(Continued)

(52) U.S. Cl.
CPC .......... *G06T 3/0068* (2013.01); *G06K 9/4609* (2013.01); *G06K 9/4652* (2013.01);
(Continued)

(58) Field of Classification Search
CPC . G06T 2207/10148; G06T 2207/10152; G06T 2207/20208; G06T 2207/10144;
(Continued)

(56) References Cited

U.S. PATENT DOCUMENTS

2013/0195377 A1* 8/2013 Muninder ............ G06K 9/6203
382/294
2015/0070523 A1* 3/2015 Chao .................. H04N 5/23216
348/218.1

OTHER PUBLICATIONS

International Search Report and Written Opinion received for corresponding Patent Cooperation Treaty Application No. PCT/FI2013/050655, dated Jun. 14, 2013, 12 pages.
Yang F., and Fu K. "Medical Images Registration Based on Gradient Mutual Information and Improved Genetic Algorithm", IEEE 2012 International Conference on Communication Systems and Network Technologies, May 11, 2012.
(Continued)

*Primary Examiner* — Yon Couso
(74) *Attorney, Agent, or Firm* — Nokia Technologies Oy

(57) ABSTRACT

In an example embodiment a method, apparatus and computer program product are provided. The method includes calculating directionality values for pixels of a first image and pixels of a second image, where a directionality value for a pixel is calculated based on gradient differences between the pixel and a plurality of neighboring pixels. The method includes determining a plurality of similarity values between the first image and the second images for a plurality of alignment positions of the first image and the second image based on the directionality values for the pixels of the first image and the directionality values for corresponding pixels of the second image. The method further includes selecting an alignment position from among the plurality of alignment positions for aligning the first image and the second image based on comparison of the plurality of similarity values.

21 Claims, 8 Drawing Sheets

(51) Int. Cl.
  *G06K 9/68* (2006.01)
  *G06K 9/46* (2006.01)
  *G06T 3/40* (2006.01)
  *G06T 7/32* (2017.01)
(52) U.S. Cl.
  CPC ......... *G06K 9/6204* (2013.01); *G06K 9/6215* (2013.01); *G06K 9/6857* (2013.01); *G06T 3/4038* (2013.01); *G06T 7/32* (2017.01); *G06T 2207/10144* (2013.01); *G06T 2207/10148* (2013.01); *G06T 2207/10152* (2013.01); *G06T 2207/20016* (2013.01); *G06T 2207/20208* (2013.01)
(58) Field of Classification Search
  CPC ... G06T 3/0068; G06T 3/4038; G06T 7/0024; G06K 9/6204; G06K 9/6857; G06K 9/4609; G06K 9/4652; G06K 9/6215
  USPC ........................................................ 382/165
  See application file for complete search history.

(56) References Cited

OTHER PUBLICATIONS

Hinterstoisser S, et al., "Gradiet Response Maps for Real-Time Detection of Textureless Objects", IEEE Transactions on Pattern Analysis and Machine Intelligence, vol. 34, No. 5. May 2012.

He Z and Zhu Y., "A Fast Object Detection Method with Rotation Invariant Features", World Academy of Science, Engineering and Technology vol. 5, Jul. 2011.

Mahesh and Subramanyam M., "Automatic feature based image registration using SIFT algorithm", IEEE 2012 Third International Conference on Computing Communication and Networking Technologies, Jul. 2012 Coibatore, India.

Huang F-C, et al., "High-Performance SIFT Hardware Accelerator for Real-Time Image Feature Extraction", IEEE Transactions on Circuits and Systems for Video Technology, vol. 22, No. 3, Mar. 2012.

* cited by examiner

METHOD, APPARATUS AND COMPUTER PROGRAM PRODUCT FOR ALIGNMENT OF IMAGES

RELATED APPLICATION

This application was originally filed as Patent Cooperation Treaty Application No. PCT/FI2013/050655 filed Jun. 14, 2013.

TECHNICAL FIELD

Various implementations relate generally to method, apparatus, and computer program product for alignment of images.

BACKGROUND

Various electronic devices such as cameras, mobile phones, and other devices are now widely used for capturing images and post-capture processing of the images. There are several image processing applications that operate on more than one input images and such applications require images to be aligned before further processing the input images. An example, among many examples of such applications, is high dynamic range (HDR), where several images with varying exposures are combined. Another example may be to combine two images, where one image is captured with flash and another image is captured without flash. Another example may be multi-image noise reduction where several noisy images are combined. Another example may be composite images, where images with moving objects are combined to generate artistic effects. Another example would be 'remove' application, where images with moving objects are combined to generate an output image without the moving objects. In the applications described herein, a number of requirements on the image alignment algorithm can be formulated. For example, it should be exposure invariant, lighting invariant, noise resistant and resistant to moving objects. Further, if the implementation is to be done on a portable device with reduced computing power, the implementation should also be very time-efficient.

SUMMARY OF SOME EMBODIMENTS

Various aspects of examples embodiments are set out in the claims.

In a first aspect, there is provided a method comprising: calculating directionality values for pixels of a first image, wherein a directionality value for a pixel is calculated based on gradient differences between the pixel and a plurality of neighboring pixels of the pixel of the first image; calculating directionality values for pixels of a second image, wherein a directionality value for a pixel is calculated based on gradient differences between the pixel and a plurality of neighboring pixels of the pixel of the second image; determining a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and selecting an alignment position from among the plurality of alignment positions for aligning the first image and the second image based on comparison of the plurality of similarity values.

In a second aspect, there is provided an apparatus comprising at least one processor; and at least one memory comprising computer program code, the at least one memory and the computer program code configured to, with the at least one processor, cause the apparatus to perform at least: calculate directionality values for pixels of a first image, wherein a directionality value for a pixel is calculated based on gradient differences between the pixel and a plurality of neighboring pixels of the pixel of the first image; calculate directionality values for pixels of a second image, wherein a directionality value for a pixel is calculated based on gradient differences between the pixel and a plurality of neighboring pixels of the pixel of the second image; determine a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and select an alignment position from among the plurality of alignment positions for aligning the first image and the second image based on comparison of the plurality of similarity values.

In a third aspect, there is provided a computer program product comprising at least one computer-readable storage medium, the computer-readable storage medium comprising a set of instructions, which, when executed by one or more processors, cause an apparatus to perform at least: calculate directionality values for pixels of a first image, wherein a directionality value for a pixel is calculated based on gradient differences between the pixel and a plurality of neighboring pixels of the pixel of the first image; calculate directionality values for pixels of a second image, wherein a directionality value for a pixel is calculated based on gradient differences between the pixel and a plurality of neighboring pixels of the pixel of the second image; determine a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and select an alignment position from among the plurality of alignment positions for aligning the first image and the second image based on comparison of the plurality of similarity values.

In a fourth aspect, there is provided an apparatus comprising: means for calculating directionality values for pixels of a first image, wherein a directionality value for a pixel is calculated based on gradient differences between the pixel and a plurality of neighboring pixels of the pixel of the first image; means for calculating directionality values for pixels of a second image, wherein a directionality value for a pixel is calculated based on gradient differences between the pixel and a plurality of neighboring pixels of the pixel of the second image; means for determining a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and means for selecting an alignment position from among the plurality of alignment positions for aligning the first image and the second image based on comparison of the plurality of similarity values.

In a fifth aspect, there is provided a computer program comprising program instructions which when executed by an apparatus, cause the apparatus to: calculate directionality values for pixels of a first image, wherein a directionality value for a pixel is calculated based on gradient differences between the pixel and a plurality of neighboring pixels of the pixel of the first image; calculate directionality values for pixels of a second image, wherein a directionality value for a pixel is calculated based on gradient differences between the pixel and a plurality of neighboring pixels of the pixel of the second image; determine a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and select an alignment position from among the plurality of alignment positions for aligning the first image and the second image based on comparison of the plurality of similarity values.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7A-7B of the drawings.

Figure 1:
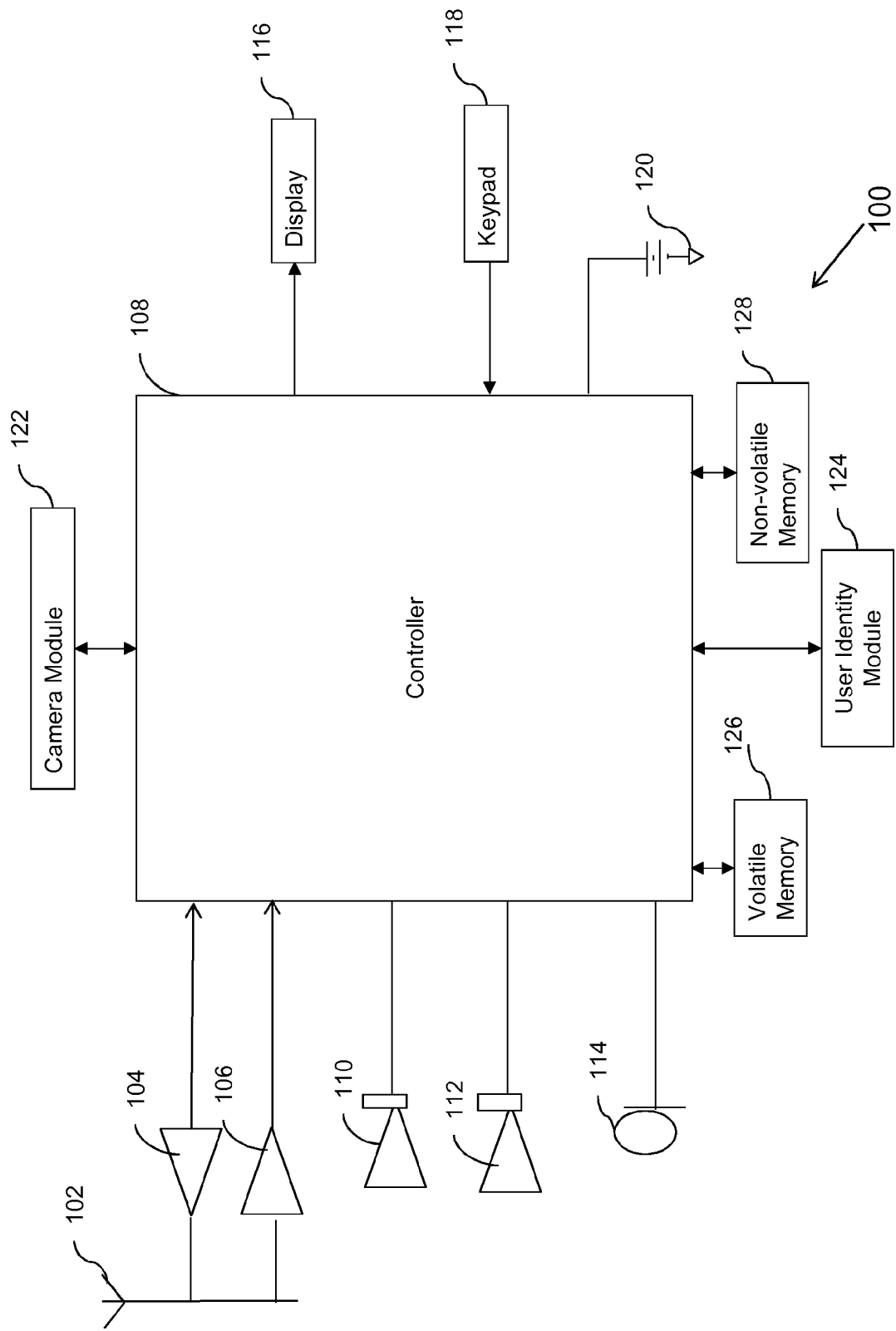
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
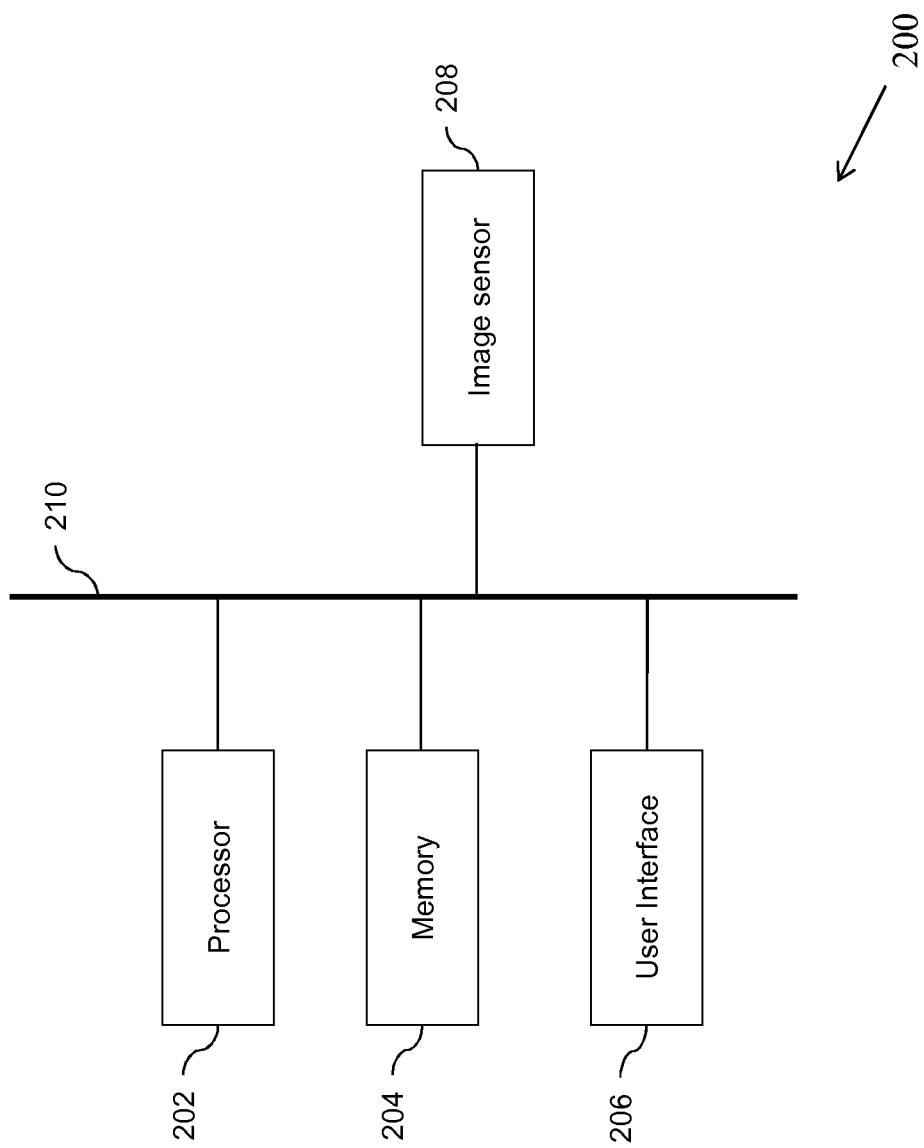
FIG. 2 illustrates an apparatus for alignment of images, in accordance with an example embodiment.

FIG. 2 illustrates an apparatus 200 to perform alignment of images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include, but are not limited to, a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include, but are not limited to, audio content, video content, data, or a combination thereof.

In an example embodiment, the electronic device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, alongwith other components may also be configured to capture images.

In an example embodiment, these components (202-208) may communicate to each other via a centralized circuit system 210 to perform alignment of images. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

Various example embodiments are described with the example of alignment of two images for example, a first image and a second image, and such example embodiments may be applicable for alignment of a plurality of images. In an example embodiment, the apparatus 200 may be caused to capture the first image and the second image. Alternatively, in some other example embodiments, the first image and the second image may be prerecorded or stored in the apparatus 200, or may be received from sources external to the apparatus 200. In such example embodiments, the apparatus 200 is caused to receive the first image and the second image from external storage medium such as DVD, compact disk (CD), flash drive, memory card, or received from external storage locations through Internet, Bluetooth®, and the like. In an example, the first image and the second image may be examples of images captured in high dynamic range (HDR) sequence. In another example, the first image and the second image may be images captured of a same scene, where there may be some movement of one or more objects while capturing any of the first image and the second image. In another example, the first image and the second image may be examples of images captured of a same scene where there may be slight camera movement while capturing any of the first image and the second image. In another example, the first image and the second image may be images captured of a same scene with different image capturing parameters, for example, by using any or combinations of parameters such as varying exposure, varying lighting conditions, flash/no flash, and the like.

In an example embodiment, the processor 202 is configured to, with the content of the memory 204, and optionally with other components described herein, to cause the apparatus 200 to calculate directionality values for pixels of the first image. In an example embodiment, a directionality value for a pixel of the first image is calculated based on gradient differences between the pixel and a plurality of neighboring pixels of the pixel of the first image. In an example embodiment, the apparatus 200 is also caused to calculate directionality values for pixels of the second image. In an example embodiment, a directionality value for a pixel of the second image is calculated based on gradient differences between the pixel and a plurality of neighboring pixels of the pixel of the second image. For example, for a pixel of the first or second images, the plurality of neighboring pixels such as four, six or eight (or any other number) may be selected, and the gradient differences between the pixel and the selected neighboring pixels may be calculated. In an example embodiment, a processing means may be configured to generate directionality values for the pixels of the first image and the second image. An example of the processing means may include the processor 202, which may be an example of the controller 108.

In an example embodiment, the apparatus 200 is caused to calculate a directionality value for a pixel (for example, a pixel of the pixels of the first image or the pixels of the second image) by calculating a plurality of gradient differences between the pixel and a plurality of neighboring pixels of the pixel. In an example embodiment, the apparatus 200 is caused to select a neighboring pixel from among the plurality of neighboring pixels based on the comparison of the plurality of gradient differences. In an example embodiment, the apparatus 200 is caused to assign the directionality value for the pixel based on a direction of the selected neighboring pixel with respect to the pixel. In an example embodiment, the directionality value may comprise n binary bits, where n−1 bits may be '0' and one bit may be '1', where n may be a positive natural number. In an example embodiment, n may be equal to number of directions of the plurality of neighboring pixels with respect to the pixel. It should also be noted that some other assignment patterns of binary bits or some other numbering systems (for example, octal, hexadecimal) may also be defined for the directionality values. In an example embodiment, a processing means may be configured to calculate a directionality value for a pixel. An example of the processing means may include the processor 202, which may be an example of the controller 108.

In an example embodiment, gradient difference between the pixel and the plurality of neighboring pixels may be a directional change in the intensity or color between the pixel and the plurality of neighboring pixels. In other example embodiments, the gradient difference may also be associated with changes in any other parameters associated with pixels that provide information about the pixels of the image. In an example embodiment, gradient differences between the pixel (for which the directionality value is to be calculated) and the neighboring pixels of the pixel may be calculated. In an example embodiment, gradient differences between the pixel and all of the neighboring pixels of the pixel may be calculated. Alternatively, in some example embodiments, gradient differences between the pixel and neighboring pixels (located in only some directions with respect to the pixel) may be calculated. For example, neighboring pixels that lie in four directions, for example, right, down-right, down and down-left with respect to the pixel may be calculated.

In an example embodiment, the apparatus 200 is caused to select a neighboring pixel from among the plurality of neighboring pixels based on the plurality of gradient differences. In an example embodiment, the neighboring pixel associated with the maximum gradient difference (among the plurality of gradient differences) may be selected. However, in some example embodiment, the neighboring pixel associate with second largest or third largest gradient difference may also be selected. In an example embodiment, a processing means may be configured to select a neighboring pixel from among the plurality of neighboring pixels. An example of the processing means may include the processor 202, which may be an example of the controller 108.

In an example embodiment, the directionality value comprises n binary bits, where n−1 bits is '0' and one bit is '1'. In an example embodiment, if there are no gradient differences between the pixel and the neighboring pixels, all zero bits may be assigned to the directionality value for the pixel, for example, all of the n binary bits may be '0'. In an example embodiment, if there are four neighboring pixels (in four different directions) of the pixel for which the gradient difference is calculated, there may be four different directionality values for the four different directions. For example, if the selected neighboring pixel (associated with the maximum gradient difference) is in the right direction from the pixel, the directionality value for the pixel may be assigned as 0001. Further, if the selected neighboring pixel is in the down-right direction from (or with respect to) the pixel, the directionality value for the pixel may be assigned as 0010; if the selected neighboring pixel is in the downward direction from the pixel, the directionality value for the pixel may be assigned as 0100; and if the selected neighboring pixel is in the down-left direction from the pixel, the directionality value for the pixel may be assigned as 1000. It should be noted that in the example of the four directions, the directionality value for the pixel may be one of 0001, 0010, 0100 and 1000.

In an example embodiment, the directionality value for each pixel of the first image and the second image is calculated depending upon the selected neighboring pixel for the each pixel. In an example embodiment, for each pixel, a direction is determined in which there is maximum gradient difference between the pixel and a neighboring pixel in that direction. Without loss of generality, it should be noted that for each pixel of the first image and the second image, the directionality value may be assigned as one of 0001, 0010, 0100 and 1000. Herein, the directionality values for the pixels of the first image I1 may be termed as a 'directionality map of the image I1', and the directionality values for the pixels of the second image I2 may be termed as a 'directionality map for the image I2'.

In an example embodiment, the processor 202 is configured to, with the content of the memory 204, and optionally with other components described herein, to cause the apparatus 200 to determine a plurality of similarity values between the first image and the second images for a plurality of alignment positions for the first image and the second image. Herein, an alignment position for the first image (I1) and the second image (I2) refers to pixel by pixel correspondences between the image I1 and the image I2. In an example representation, each pixel of the images I1 and I2 may be represented with a pixel location in X and Y directions (or axes). For example, if the resolution of the images I1 and I2 is 1200×800, each pixel may have a location $(X_i, Y_j)$, where i varies from 0 to 1199 and j varies from 0 to 799. In an example representation, $I1(X_i, Y_j)$ represents a pixel at $i^{th}$ location in X direction and $j^{th}$ location in Y direction in the image I1, and $I2(X_i, Y_j)$ represents a pixel at $i^{th}$ location in X direction and $j^{th}$ location in Y direction in the image I2. In an example embodiment, a processing means may be configured to determine a plurality of similarity values between the first image and the second images for a plurality of alignment positions for the first image I1 and the second image I2. An example of the processing means may include the processor 202, which may be an example of the controller 108.

In an example embodiment, there may be offset of one or more pixels between different alignment positions (for example, $AP_1, AP_2, \ldots, AP_N$) of the images I1 and I2. For example, in an alignment position 'AP1', I1 (Xi, Yj) may correspond to I2(Xi, Yj), for example I1(X0, Y0) may correspond to I2(X0, Y0), I1(X1, Y1) may correspond to I2(X1, Y1), and so on. In another alignment position 'AP2', there may be an offset of one pixel in X direction such that I1 (Xi, Yj) may correspond to I2 (Xi+1, Yj), for example, I1(X0, Y0) may correspond to I2(X1, Y0), I1 (X1, Y1) may correspond to I2(X2, Y1), and so on. In another alignment position 'AP3', there may be an offset of one pixel in each of the X axis and Y axis such that I1 (Xi, Yj) may correspond to I2 (Xi+1, Yj+1). For example, in AP3, I1(X0, Y0) may correspond to I2 (X1, Y1), and I1 (X1, Y1) may correspond to I2 (X2, Y2), and so on. It should be noted that by introducing offsets (of one or more pixels) in X and/or Y directions, several alignment positions may be selected for the images I1 and I2.

In an example embodiment, a similarity value for an alignment position of the image I1 and the image I2 is determined based at least on the directionality values for the pixels of the image I1 and the directionality values for corresponding pixels of the image I2 associated with the alignment position of the images I1 and I2. For instance, in an example embodiment, for determining a similarity value for the alignment position, the apparatus 200 is caused to perform a logical AND operation of the directionality values for the pixels of the image I1 and the directionality values for the corresponding pixels of the image I2 associated with the alignment position for the image I1 and image I2. In an example embodiment, the logical AND operation is a bit-wise logical AND operation.

For example, for the alignment position AP1, a similarity value is calculated by performing a bit-wise logical AND operation for the corresponding pixels of the images I1 and I2. The bit-wise AND operation is performed between directionality values of corresponding pixels in the images I1 and I2, for example between I1(x0, y0) and I2 (x0, y0), between I1(x0, y1) and I2 (x0, y1), between I1(x1, y1) and I2 (x1, y1), and so on.

It should be noted that as the bit-wise AND operation is performed between the directionality values of the corresponding pixels of the images I1 and I2, a result of the bit-wise AND operation will be all zero bits, if the directionality values of the corresponding pixels (for the alignment position, for example AP1) are different in the images I1 and I2. For example, if the directionality value for a pixel I1(x1, y1) is '0100', and the directionality value of the I2 (x1, y1) is '0010', the bit-wise AND result is '0'. Further, if the directionality value for the I1(x1, y1) is '0100', and the directionality value of the I2 (x1, y1) is '0100', the bit-wise AND result is '1'. Similarity for other corresponding pixels of the images I1 and I2 (for the alignment position AP1), bit-wise AND operations are performed. In an example embodiment, the results of the AND operations of the pairs of corresponding pixels of the images I1 and I2 (for the alignment position AP1) is stored. It should be noted that for some alignment positions, for pixels at some locations in the images I1, there will not be corresponding pixels in the image I2, or vice versa. For example, in AP2 (where I1(Xi, Yj) correspond to I2 (Xi+1, Yj) and the resolution of the image I1 and I2 is 1200*800), for the I1(1200, Yj) there will not be any corresponding pixels in the image I2. In an example embodiment, for such pixel pairs, the logical bit-wise AND operation may not be performed, or may be performed with a constant such as '0000' or '1111'.

In an example embodiment, the apparatus 200 is caused to calculate the similarity value for the AP1 as equal to number of 1's in results of the logical AND operations for the pairs of corresponding pixels of the images I1 and I2. It should be noted that the apparatus 200 is caused to determine the plurality of similarity values for the plurality of alignment positions (for example, AP1, AP2 . . . APn) for the images I1 and I2.

In an example embodiment, the apparatus 200 is caused to select an alignment position from among the plurality of alignment positions (for example, AP1, AP2 . . . APn) for aligning the image I1 and the image I2 based on the plurality of similarity values for the plurality of alignment positions. In an example embodiment, selecting the alignment position from among the plurality of alignment positions comprises selecting the alignment position that has a maximum similarity value of the plurality of similarity values. It should be noted that because of the assigned directionality values (i.e., binary bits comprising only one bit as '1' and rest bits as '0' of an n bit binary pattern) only two pixels with the same directionality bit pattern would be non-zero upon performing the bit-wise AND operation. It should also be noted for an alignment position, if the directionality values for the corresponding pixels in the images I1 and I2 are different, the result of their bit-wise AND operation will always be a zero and it may represent that the corresponding pixels are not same and do not align to each other. In an example embodiment, the alignment position from among the plurality of alignment positions, for which the determined similarity value between the images I1 and I2 is maximum (for example, for which there is a maximum numbers of '1' in the results of the AND operations for the pairs of corresponding pixels in the images I1 and I2), may represent the best alignment position of the images I1 and I2. In an example embodiment, a processing means may be configured to select an alignment position from among the plurality of alignment positions. An example of the processing means may include the processor 202, which may be an example of the controller 108.

In another example embodiment, the apparatus 200 is caused to perform the alignment of input images by first converting the input images into downscaled images of lower resolutions, and then selecting an alignment position for the downscaled images. The apparatus 200 is further caused to upscale the downscaled images (to generate next upscaled images) by a factor, and again select an alignment position for the next upscaled images based on the previously determined alignment position. The apparatus 200 is caused to repeat the upscaling of the images and selecting an alignment position for the upscaled images based on the alignment position of the immediately preceding upscaled images. The apparatus 200 is caused to repeat/iterate the sequence of upscaling and selecting the alignment position until the alignment position for the input images are determined. An example of this embodiment may be explained with alignment of input images, where each input image has a resolution of 1200*800. In this example, the original input images, for example, a first input image and a second input image (each having resolutions of 1200*800) may be downscaled by a first factor, for example, 16 to generate a first image (I1) and the second image (I2) (each having resolutions of 75*50).

In an example embodiment, in a first iteration, the apparatus 200 is caused to select an alignment position of the first image I1 and the second image I2, as described above. For instance, the apparatus 200 is caused to determine directionality values for the images I1 and I2, and determine a plurality of similarity values between the images I1 and I2 for a plurality of alignment positions for the images I1 and I2, and to select an alignment position from among the plurality of alignment positions for aligning the images I1 and I2 based on comparison of the plurality of similarity values.

The apparatus 200 is caused to further scale up the resolutions of the images I1 and I2 to generate a first scaled image ($I1_{S1}$) and a second scaled image ($I2_{S1}$). In an example, the images I1 and I2 may be scaled up by a second factor (for example, two) to generate the images $I1_{S1}$ and $I2_{S1}$ of resolutions of 150*100.

The apparatus 200 is further caused to calculate directionality values for the pixels of the image $I1_{S1}$ and pixels of the image $I2_{S1}$. As already explained, the directionality values for a pixel of the images $I1_{S1}$ or $I2_{S1}$ may be assigned as binary bits based on a direction, in which there is maximum gradient difference between the pixel and a neighboring pixel in that direction.

The apparatus 200 is further caused to determine one or more alignment positions for calculating the similarity values between the images $I1_{S1}$ and $I2_{S1}$. In an example embodiment, the one or more alignment positions are determined based on the selected alignment position in a previous iteration. For example, for the images $I1_{S1}$ and $I2_{S1}$ (of resolutions 150*100), the one or more alignment positions may be determined based on the alignment position selected for the images I1 and I2. For example, the one or more alignment positions may be determined by introducing an offset of one or more pixels with respect to the alignment position selected for the images I1 and I2.

For example, if a pixel I1(Xi, Yj) corresponds to a pixel I2 (Xi+2, Yj+3) in the selected alignment position for the images I1 and I2, the one or more alignment positions for the images $I1_{S1}$ and $I2_{S1}$ may be any offset by a threshold number of pixels in any of the $I1_{S1}$ or $I2_{S1}$. For instance, one or more alignment positions for the images $I1_{S1}$ and $I2_{S1}$ may be chosen such that the $I1_{S1}$ (Xi, Yj) may correspond to $I2_{S1}$ (Xi+2±Δ, Yj+3±Δ), where Δ may be zero, one or two pixels. Accordingly, there are five alignment positions determined for the images $I1_{S1}$ and $I2_{S1}$, for example, $AP1_{S1}$, where $I1_{S1}$(Xi, Yj) may correspond to $I2_{S1}$(Xi+2, Yj+3); $AP2_{S1}$, where $I1_{S1}$(Xi, Yj) may correspond to $I2_{S1}$(Xi+3, Yj+4); $AP3_{S1}$, where $I1_{s1}$(Xi, Yj) may correspond to $I2_{S1}$ (Xi+1, Yj+2); $AP4_{S1}$, where $I1_{S1}$(Xi, Yj) may correspond to $I2_{S1}$(Xi+4, Yj+5); and $AP5_{S1}$, where $I1_{S1}$(Xi, Yj) may correspond to $I2_{S1}$(Xi, Yj+1). In some embodiments, there may be different offsets in X and Y directions, as well, for example, an offset of one pixel in X direction and offset of 2 pixels in Y direction. In such embodiments, the one or more alignment positions for the images $I1_{S1}$ and $I2_{S1}$ may be chosen such that the $I1_{S1}$(Xi, Yj) may correspond to $I2_{S1}$ (Xi+2±$Δ_1$, Yj+3±$Δ_2$), where $Δ_1$ and $Δ_2$ may be different.

In an example embodiment, the apparatus 200 is caused to determine a plurality of similarity values between the images $I1_{S1}$ and $I2_{s1}$ for the one or more alignment positions (for example, $AP1_{S1}$, $AP2_{S1}$, $AP3_{S1}$, $AP4_{S1}$ and $AP5_{S1}$). As already described, the similarity values for an alignment position (of $AP1_{S1}$, $AP2_{S1}$, $AP3_{S1}$, $AP4_{S1}$ and $AP5_{S1}$) are determined by performing bit-wise AND operation of the directionality values of the corresponding pixels of the images $I1_{S1}$ and $I2_{s1}$.

In an example embodiment, the apparatus 200 is caused to select an alignment position from among the plurality of alignment positions for aligning the first scaled image $I1_{S1}$ and the second scaled image $I1_{S2}$ based on the plurality of similarity values between the first scaled image $I1_{S1}$ and the second scaled images $I1_{S2}$. For example, the alignment position, for which the similarity value between the images $I1_{S1}$ and $I2_{S1}$ is maximum from among the plurality of similarity values, is selected as the alignment position for aligning the images $I1_{S1}$ and $I2_{s1}$.

The apparatus 200 is further caused to upscale the resolution of the images $I1_{S1}$ and $I2_{s1}$ to generate a new first scaled image (for example, $I1_{S2}$) and a new second scaled image (for example, $I2_{s2}$). For example, the $I1_{S1}$ and $I2_{s1}$ (each having resolution of 150*100) are scaled by a factor of two to generate the images $I1_{S2}$ and $I2_{s2}$, each having resolution of 300*200.

The apparatus 200 is further caused to calculate directionality values for the pixels of the images $I1_{S2}$ and $I2_{s2}$ (each having resolution of 300*200). The apparatus 200 is caused to determine one or more alignment positions for calculating the similarity values between the images $I1_{S2}$ and $I2_{s2}$ for the alignment positions. In an example embodiment, the one or more alignment positions are determined based on the alignment position selected for the images $I1_{S1}$ and $I2_{S1}$ in the immediately preceding iteration. For example, if the $AP2_{S1}$ has been selected as the alignment position for the images $I1_{S1}$ and $I2_{S1}$, the one or more alignment positions may be determined based on any offset by a threshold number of pixels in any of the images $I1_{S2}$ or $I2_{S2}$ with respect to the $AP2_{S1}$. For instance, one or more alignment positions for the images $I1_{S2}$ and $I2_{S2}$ may be chosen such that the $I1_{S2}$(Xi, Yj) may correspond to $I2_{S2}$ (Xi+3±Δ, Yj+4±Δ), where Δ may be zero or one pixel. Accordingly, there are three alignment positions selected for the $I1_{S2}$ and $I2_{S2}$, for example, $AP1_{S2}$, where $I1_{S2}$(Xi, Yj) may correspond to $I2_{S2}$(Xi+3, Yj+4); $AP2_{S2}$, where $I1_{S2}$(Xi, Yj) may correspond to $I2_{S2}$(Xi+4, Yj+5); and $AP3_{S2}$, where $I1_{S2}$(Xi, Yj) may correspond to $I2_{S2}$(Xi+2, Yj+3). In some embodiments, the one or more alignment positions for the images $I1_{S2}$ and $I2_{S2}$ may also be chosen such that the $I1_{S2}$(Xi, Yj) may correspond to $I2_{S2}$ (Xi+3±$Δ_1$, Yj+4±$Δ_2$), where $Δ_1$ and $Δ_2$ may be different.

In an example embodiment, the apparatus 200 is caused to determine a plurality of similarity values between the images $I1_{S2}$ and $I2_{s2}$ for the one or more alignment positions (for example, $AP1_{S2}$, $AP2_{S2}$ and $AP3_{S2}$). In an example embodiment, the apparatus 200 is further caused to select an alignment position from among the plurality of alignment positions for aligning the images $I1_{S2}$ and $I2_{s2}$.

It should be noted that the apparatus 200 is caused to upscale the resolution of the images of the previous iteration and determine the alignment position for the upscaled images, and this process is repeated until the resolution of the upscaled images are equal to the resolutions of the first input image and the second input image. For example, the apparatus 200 is caused to select an alignment position for $I1_{S3}$ and $I2_{S3}$ (each having resolutions of the 600*400), and thereafter, in a next iteration, the apparatus 200 is further caused to select an alignment position for $I1_{S4}$ and $I2_{S4}$ (each having resolutions of the 1200*800), that is same as the first input image and the second input images. In an example embodiment, in this manner, the alignment position for the first input image and the second input images is determined in an iterative manner.

Figure 3:
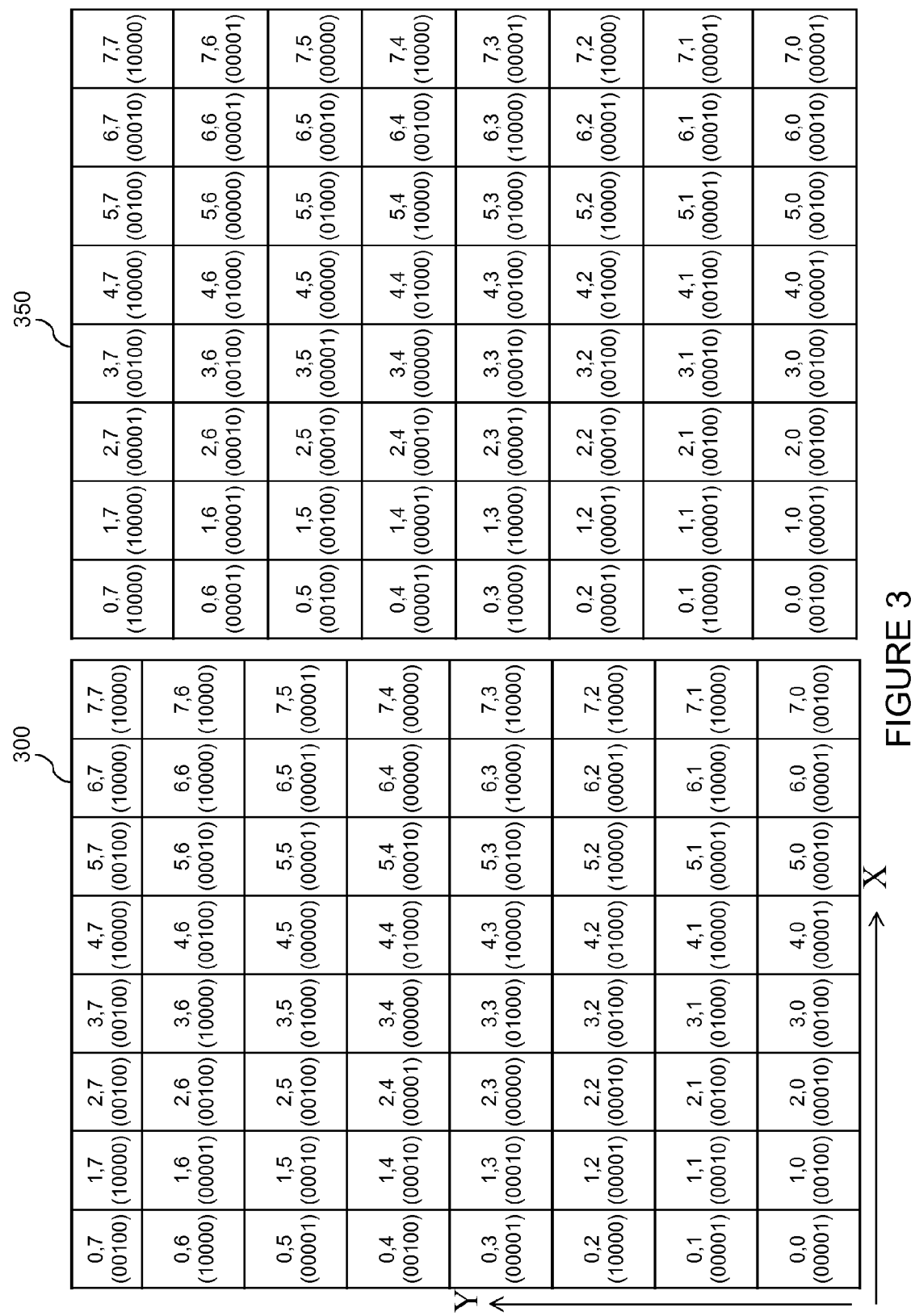
FIG. 3 illustrates an example representation of directionality values of pixels of two images, in accordance with an example embodiment.

FIG. 3 represents an example of directionality values for pixels in two image I1 (shown by 300) and I2 (shown by 350). Some examples of directionality values are shown in the image 300 and the image 350. For the purpose of this description, the resolution of the images 300 and 350 are shown as 8*8, and each of the sixty four pixels are represented by their X and Y positions. For example "2, 1" represents a pixel at (X, Y) position, where X=2 and Y=1.

In this example representation, directionality value for a pixel is selected from directionality values in five directions with respect to the pixel, for example, upward, up-right, right, right-downward and downward directions. It should be noted that terminologies used for the directions such as upward, up-right, right, right-downward and downward are used for the simplicity of this description only, and these directions may be viewable on a UI if the images are displayed thereon, form at least one view presented to the viewer. It should be noted that the purpose of introducing the directions such as upward, up-right, right, right-downward and downward directions are only for representing some directions with respect to the pixel. It should be noted that for each direction, there will be a unique directionality value of the pixel, and each directionality value will have n binary bits, where only one bit is '1' and rest of the n−1 bits are '0'. In this example representation, directionality values, for example, 00001, 00010, 00100, 01000 and 10000 may be assigned for the directions upward, up-right, right, right-downward and downward, respectively.

In an example representation, a gradient difference between two pixels, for example, (Xi, Yj) and (Xm, Yn) may be represented as $D_{(Xi, Yj)\ (Xm, Yn)}$. For example, the gradient difference between the pixel (0, 2) and the pixel (0, 1) may be represented as $D_{(0, 2)\ (0, 1)}$. As shown in the image 300, a directionality value of '10000' (corresponding to downward direction) is assigned to the pixel (0, 2), it represents that there is a maximum gradient difference between the pixel (0, 2) and neighboring pixel in the downward direction, for example the pixel (0, 1). For example, $D_{(0, 2)\ (0, 1)}$ is more than other gradient differences such as $D_{(0, 2)\ (0, 3)}$, $D_{(0, 2)\ (1, 3)}$, $D_{(0, 2)\ (1, 2)}$ and $D_{(0, 2)\ (1, 1)}$. Further, as shown in the image 350, a directionality value of '00100' (corresponding to right direction) is assigned to the pixel (3, 2), it represents that there is a maximum gradient difference between the pixel (3, 2) and neighboring pixel in the right direction (4, 2). For example, $D_{(3, 2)\ (4, 2)}$ is more than other gradient differences such as $D_{(3, 2)\ (3, 3)}$, $D_{(3, 2)\ (4, 3)}$, $D_{(3, 2)\ (4, 1)}$ and $D_{(3, 2)\ (3, 1)}$. Similarly, directionality values for various pixels are shown in the images 300 and 350 under small brackets in FIG. 3. It should further be noted that if there is no gradient difference between the pixel and the neighboring pixels of the pixel, then '00000' may be assigned to the pixel. For instance, a directionality value of '00000' is assigned to the pixels (2, 3), (3, 4), (4, 5), (6, 4) and (7, 4) in the image 300, and to the pixels (2, 2), (3, 4), (4, 5) and (5, 6) in the image 350.

An example way of selecting alignment position for the images 300 and 350 may also be explained with help of FIG. 3. For instance, it may be assumed that the similarity values are determined for four alignment positions AP1, AP2, AP3 and AP4. Herein, it may be assumed that in AP1, (Xi, Yj) of the image 300 corresponds to (Xi, Yj) of the image 350; in AP2, (Xi, Yj) of the image 300 corresponds to (Xi, Yj+1) of the image 350; in AP3, (Xi, Yj) of the image 300 corresponds to (Xi+1, Yj+1) of the image 350; and in AP4, (Xi, Yj) of the image 300 corresponds to (Xi+1, Yj) of the image 350.

In this example, for an alignment position (AP1, AP2, AP3 or AP4), the similarity values between the images 300 and 350 is the number of '1's in the bit-wise AND operation of corresponding pixels of the images 300 and 350 for the alignment position. For instance, for AP1, bit-wise AND operation is performed for directionality values of (Xi, Yj) of the image 300 with the directionality values of (X1, Yj) of the image 300. For example, directionality values of (X0, Y0) of the image 300 are bit-wise ANDed with directionality values of (X0, Y0) of the image 350, directionality values of (X1, Y0) of the image 300 are bit-wise ANDed with directionality values of (X1, Y0) of the image 350, directionality values of (X1, Y1) of the image 300 is bitwise ANDed with directionality values of (X1, Y1) of the image 350, and so on. Further, the number of 1's are calculated in all bit-wise AND results of the corresponding pixel pairs. In the example of FIG. 3, for the AP1, the number of in the bit-wise AND results for the images 300 and 350 is '19'; for the AP2, the number of '1's in the bit-wise AND results for the images 300 and 350 is '8'; for the AP3, the number of '1's in the bit-wise AND results for the images 300 and 350 is '45'; and for the AP4, the number of '1's in the bit-wise AND results for the images 300 and 350 is '12'. As for the AP3, the similarity value is maximum among the similarity values for the AP1, AP2, AP3 and AP4, hence, the alignment position AP3 is selected as the alignment position for aligning the images 300 and 350.

Figure 4:
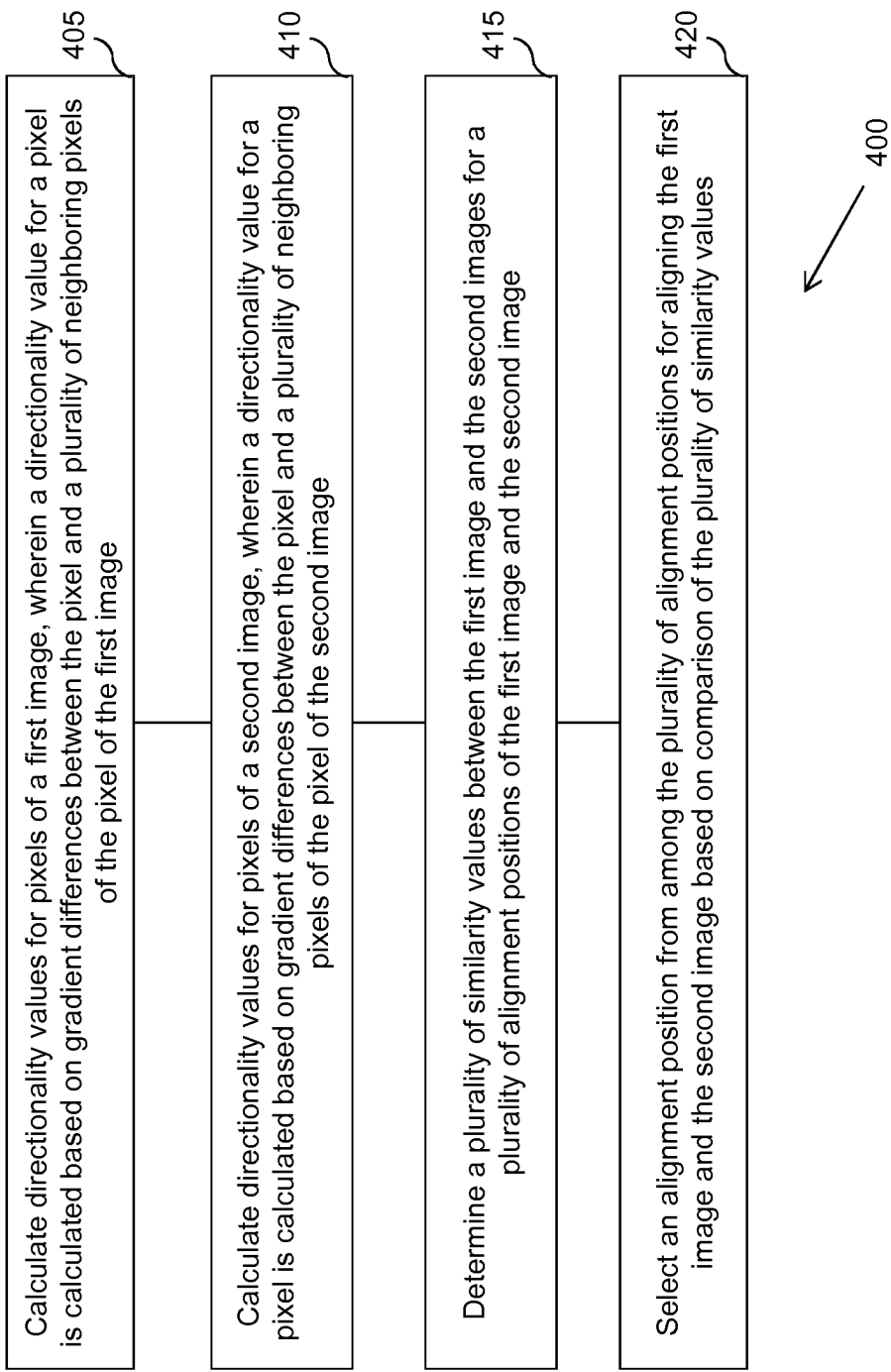
FIG. 4 is a flowchart depicting an example method for alignment of images, in accordance with an example embodiment.

FIG. 4 is a flowchart depicting an example method 400 for alignment of images, in accordance with an example embodiment. The method 400 depicted in the flow chart may be executed by, for example, the apparatus 200 of FIG. 2.

At 405, the method 400 includes calculating directionality values for pixels of a first image. In an example embodiment, a directionality value for a pixel is calculated based on gradient differences between the pixel and a plurality of neighboring pixels of the pixel of the first image. At 410, the method 400 includes calculating directionality values for pixels of a second image, wherein a directionality value for a pixel is calculated based on gradient differences between the pixel and a plurality of neighboring pixels of the pixel of the second image. In an example embodiment, a directionality value for a pixel of the first image or the second image is calculated based on gradient differences between the pixel and one or more neighboring pixels of the pixel, such as, four, six or eight (or any other number) neighboring pixels. In an example embodiment, the directionality value for a pixel is selected based on a direction of a neighboring pixel that has maximum gradient difference with the pixel. However, in some other embodiments, the directionality value for the pixel may also be based on a direction of a neighboring pixel that has a minimum gradient difference with the pixel. An example embodiment of calculating the directionality values are further explained with reference to FIG. 5.

At 415, the method 400 includes determining a plurality of similarity values between the first image and the second images for a plurality of alignment positions for the first image and the second image. In an example embodiment, a similarity value for an alignment position is determined based at least on the directionality values for the pixels of the first image and the directionality values for corresponding pixels of the second image associated with the alignment position for the first image and the second image. As described in reference to FIG. 2, an alignment position of the first image and the second image refers to pixel by pixel correspondences between the first image and the second image. An example embodiment of determination of the similarity values are further explained with reference to FIG. 6.

At 420, the method 400 includes selecting an alignment position from among the plurality of alignment positions for aligning the first image and the second image based on the comparison of the plurality of similarity values. For instance, the alignment position for which the similarity value is maximum among the plurality of similarity values is selected for aligning the first image and the second image.

Figure 5:
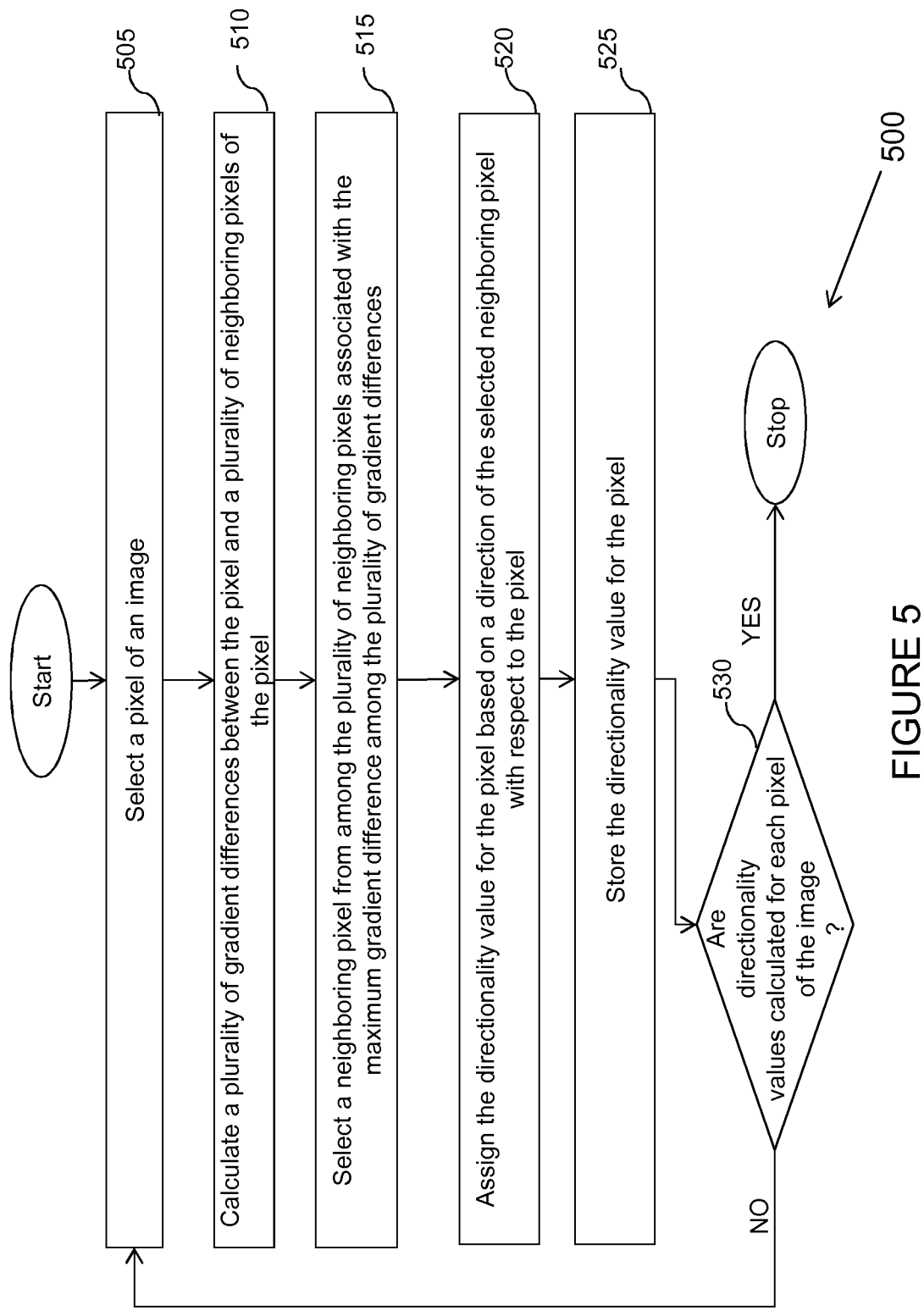
FIG. 5 is a flowchart depicting an example method of calculating directionality values of pixels in an image, in accordance with an example embodiment.

Various example embodiments of calculating directionality values for the pixels of the first image and the second image are further described with reference to FIG. 5. FIG. 5 is a flowchart depicting an example method of calculating directionality values of pixels in an image. For example, there is shown an example method 500 for calculating directionality values in an image such as the first image or the second image.

At 505, the method 500 includes selecting a pixel of an image (for example, the first image or the second image). At 510, the method 500 includes calculating a plurality of gradient differences between the pixel and a plurality of neighboring pixels of the pixel. In some example embodiments, the plurality of neighboring pixels may be all of the neighboring pixels of the pixel. However, in some example embodiments, the plurality of neighboring pixels may be selected in a plurality of directions from the pixel. For example, the plurality of neighboring pixels may be selected as immediately neighboring pixels in five directions with respect to the pixel, for example, in upward, up-right, right, right-downward and downward. In an example embodiment, each of these directions will be assigned with a unique directionality value, and each directionality value will have n binary bits, where only one bit is '1' and rest of the n−1 bits are '0'.

For example, in the example of five directions, the directionality values, for example, 00001, 00010, 00100, 01000 and 10000 may be assigned for the directions upward, up-right, right, right-downward and downward, respectively. In an example embodiment, if there is no gradient difference between the pixel with the neighboring pixels, a directionality value having all zero bits, such as '0000' may be assigned to the pixel.

At 515, the method 500 includes selecting a neighboring pixel from among the plurality of neighboring pixels based on comparison of the plurality of gradient differences. For instance, the selecting the neighboring pixel comprises determining the neighboring pixel that has the maximum gradient difference with the pixel among the plurality of neighboring pixels. For example, a gradient difference between two pixels of the image, for example, (Xi, Yj) and (Xm, Yn) may be represented as $D_{(Xi, Yj)(Xm, Yn)}$. If for the pixel (2, 3), the neighboring pixels in the directions upward, up-right, right, right-downward and downward are (2, 4), (3, 4), (3, 3), (3, 2) and (2, 2), and if $D_{(2, 3)(3, 3)}$ is more than $D_{(2, 3)(2, 4)}$, $D_{(2, 3)(3, 4)}$, $D_{(2, 3)(3, 2)}$ and $D_{(2, 3)(2, 2)}$, the neighboring pixel (3, 3) is selected for the pixel (2, 3).

At 520, the method 500 includes assigning the directionality value for the pixel based on a direction of the selected neighboring pixel with respect to the pixel. For instance, for the pixel (2, 3), the directionality value may be assigned as directionality for the right direction (i.e. direction of the pixel (3, 3) with respect to the pixel (2, 3)) for example, '00100'. At 525, the method 500 includes storing the directionality value for the pixel.

At 530, it is checked whether the directionality value is calculated for each pixel of the image. If it is determined that for all pixels, directionality values are not calculated, the method 500 proceeds to the block 505 and the operations of the blocks 505-525 are performed until the directionality values for all of the pixels of the image are calculated. The method 500 concludes if the directionality values for values for all of the pixels of the image are calculated and stored.

Figure 6:
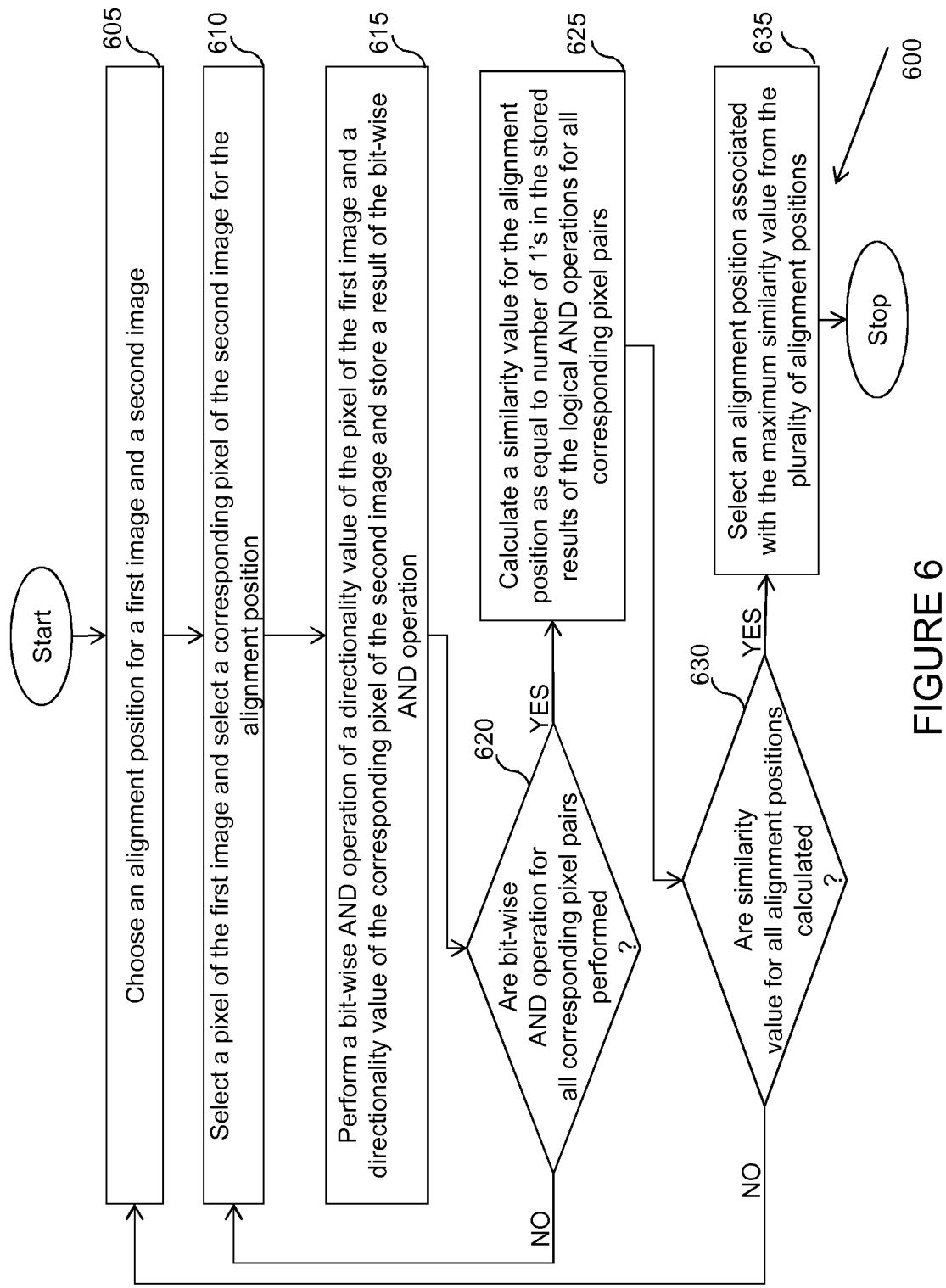
FIG. 6 is a flowchart depicting an example method of determining a plurality of similarity values between two images and selecting an alignment position for aligning the two images, in accordance with an example embodiment.

FIG. 6 is a flowchart depicting an example method of determining a plurality of similarity values between two images and selecting an alignment position for aligning the two images, in accordance with an example embodiment. The example method 600 may be an example of the blocks 415 and 420 as described in reference to FIG. 4.

At 605, the method 600 includes choosing an alignment position for a first image (I1) and a second image (I2). In an example embodiment, the alignment position may be chosen from the plurality of alignment positions for the first image I1 and the second image I2. In an example embodiment, a threshold number of alignment positions may be considered based on the resolution of the first image I1 and the second image I2, image capture conditions (for example, camera movement while capturing the images, hand movement, objects movement in the images), and any other user input. For example, there may be 10 different alignment positions determined for the alignment of the image I1 and the image I2.

At 610, the method 600 includes selecting a pixel in the image I1 and selecting a corresponding pixel in the image I2 for the selected alignment position. At 615, the method 600 includes performing a bit-wise AND operation of a directionality value of the pixel of the image I1 and the directionality value of the corresponding pixel of the image I2. At 615, a result of the AND operation for the pixel is stored. It should be noted that in an embodiment, the result of the AND operation is either a '0' or a '1'. It should further be noted that two identical/corresponding pixels in the images I1 and I2 will have same directionality values and their logical bit-wise AND operation would yield a '1'.

At 620, the method 600 includes checking whether for each corresponding pixel pairs of the images I1 and I2, bit-wise AND operation is performed. If it is not performed, the method 600 proceeds to 610, and the bit-wise AND operation is performed for the next selected pixel pairs of the images I1 and I2. If it is determined that for each corresponding pixel pairs of the images I1 and I2, the bit-wise AND operation is performed, the method 600 proceeds to 625. At 625, the method 600 includes calculating a similarity value for the selected alignment position. In an example embodiment, the similarity value for the selected alignment position is equal to number of 1's in the stored results of the logical bit-wise AND operations for all corresponding pixel pairs of the images I1 and I2. In an example embodiment, the similarity value for the alignment position is stored.

At 630, it is checked whether for each alignment position for the images I1 and I2, the similar value is determined. If it is determined that for all alignment positions for the images I1 and I2, similarity values are not determined, the method 600 proceeds to 605 to chose the next alignment position and the similarity value is determined for the next selected alignment position. At 630, if it is checked that the similarity values are determined for all of the alignment positions (for example, 10 alignment positions), the method 600 proceeds to 635.

At 635, the method 600 includes selecting an alignment position from among the plurality of alignment positions (for example, 10 alignment positions) for aligning the image I1 and the image I1 based on the plurality of similarity values for the plurality of alignment positions. In an example embodiment, selecting the alignment position from among the plurality of alignment positions comprises selecting the alignment position that has a maximum similarity value from among the plurality of similarity values. For instance, the alignment position for which there are maximum number of '1's in the results of the bit-wise AND operations of the corresponding pixel pairs of the images I1 and I2, is selected for aligning the images I1 and I2.

Figure 7A:
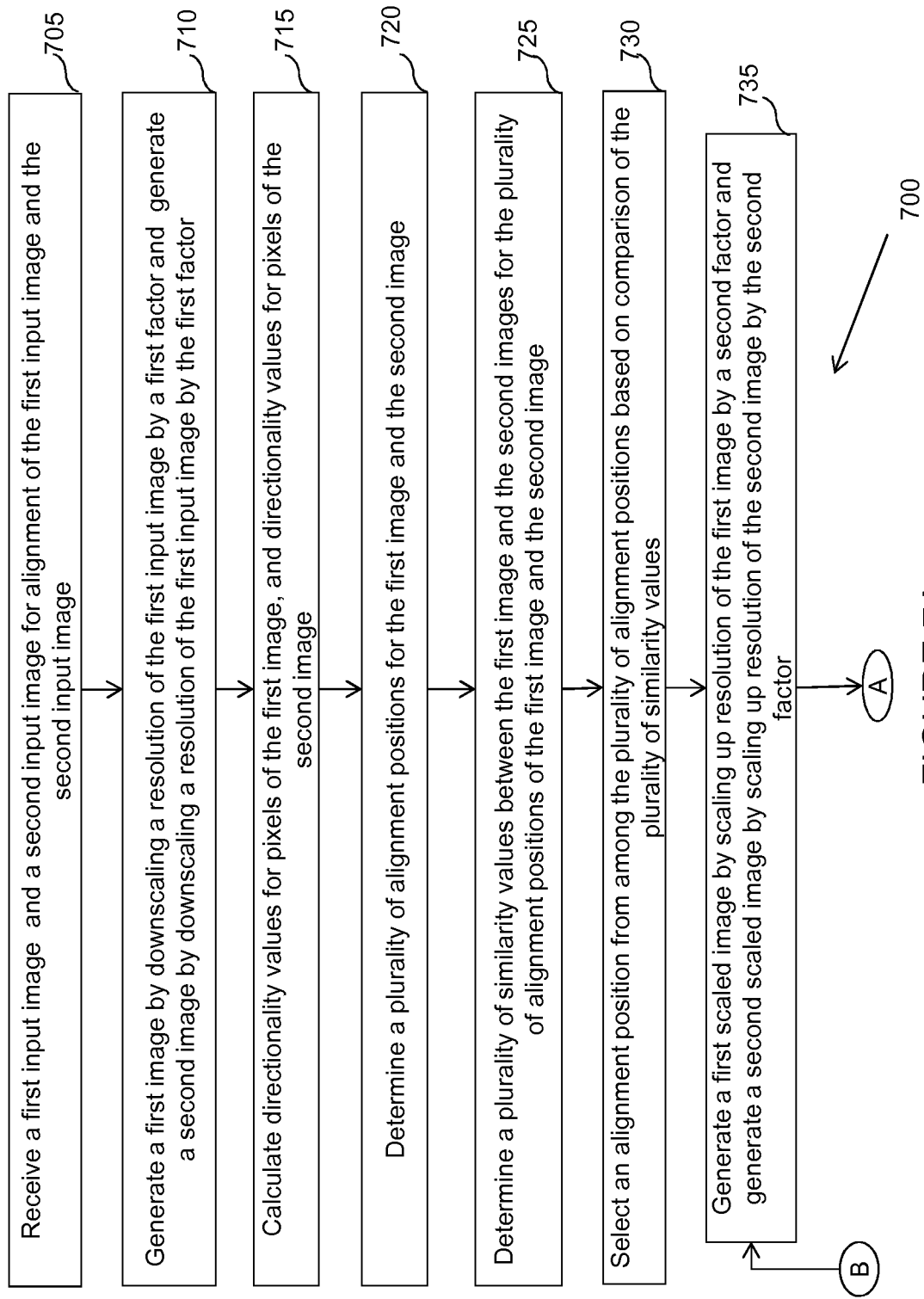
FIGS. 7A and 7B are a flowchart depicting an example method for alignment of images, in accordance with another example embodiment.
Figure 7B:
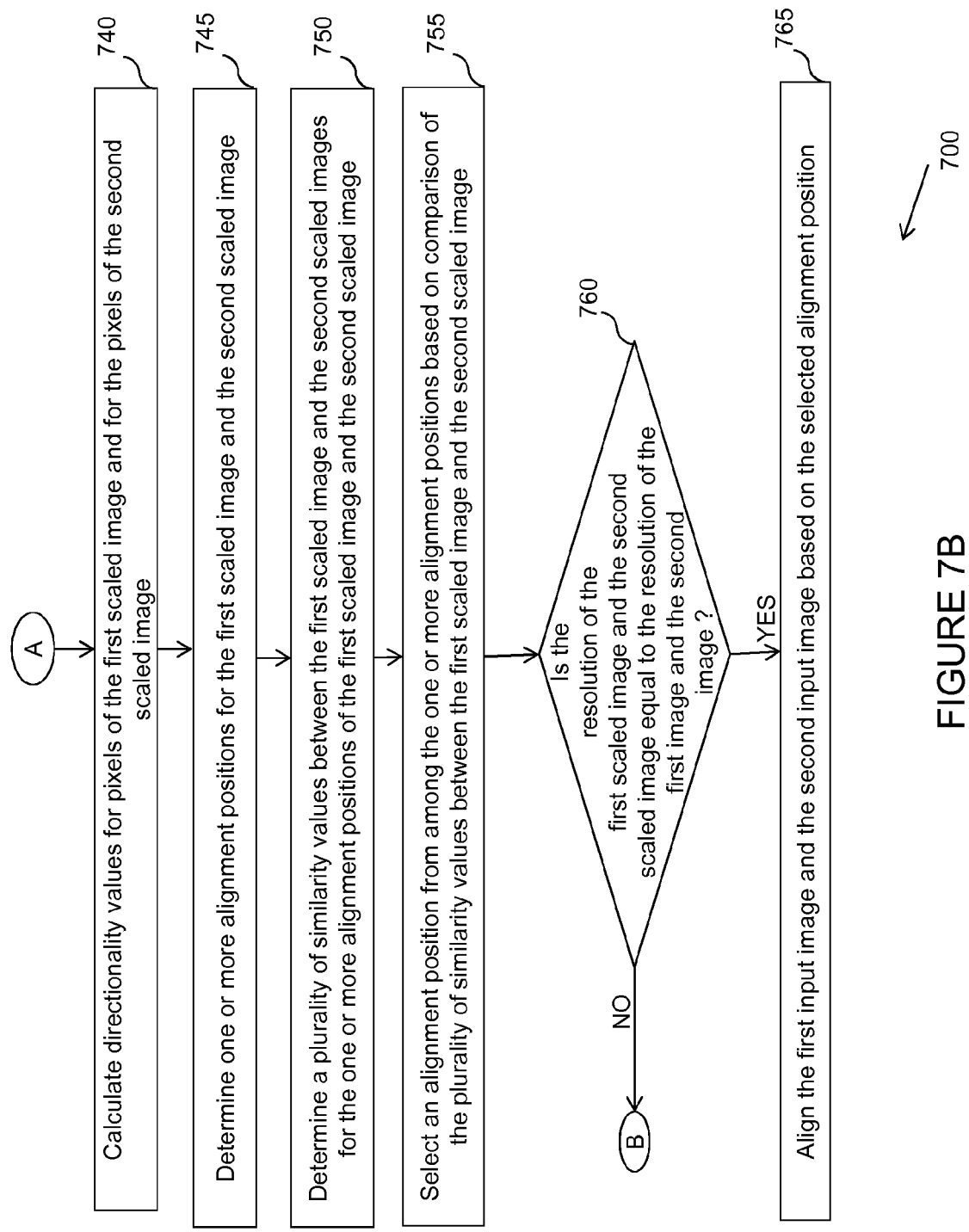

FIGS. 7A and 7B are a flowchart depicting an example method 700 for alignment of images, in accordance with another example embodiment. The method 700 depicted in the flow chart may be executed by, for example, the apparatus 200 of FIG. 2.

At 705, the method 700 includes receiving a first input image and a second input image for alignment of the first input image and the second input image. In an example embodiment, the first input image and the second input image may be captured by image sensors 208 in combination with the processor 202 and other components. Additionally or alternatively, the first input image and the second input image may be prerecorded or stored in the apparatus 200, or may be received from sources external to the apparatus 200. In an example, the first input image and the second input image may be examples of images captured in HDR sequence. In another example, the first input image and the second input image may be images captured of a same scene, where there may be some movement of one or more objects while capturing any of the first input image and the second input image. In another example, the first input image and the second input image may be examples of images captured of a same scene where there may be slight camera movement while capturing any of the first input image and the second input image. In another example, the first input image and the second input image may be images captured of a same scene with different image capturing parameters, for example, by using any or combinations of parameters such as exposure, lighting conditions, flash/no flash, and the like.

At 710, the method 700 includes generating a first image by downscaling a resolution of the first input image by a first factor. In an example, the resolution of the first input image and the second input image may be assumed to be 1200*800. In an example, the first input image and the second input image may be downscaled by the first factor (for example, 16) to generate the first image (I1) and the second image (I2), respectively, of the resolution of 75*50.

At 715, the method 700 includes calculating directionality values for pixels of the first image (I1), and directionality values for pixels of the second image (I2). An example of the operations performed at block 715 may be the operations performed by the example method 400 as described in reference to FIG. 4.

At 720, the method 700 includes determining a plurality of alignment positions for the first image (I1) and the second image (I2). In an example embodiment, a threshold number of alignment positions may be determined based on the resolution of the images I1 and I2, image capture conditions (for example, camera movement while capturing the images, hand movement, objects movement in the images), and any user input. For example, there may be 10 different alignment positions determined for the alignment of the image I1 and the image I2. For example, a first alignment position may be such that I1(Xi, Yj) corresponds to I2 (Xi, Yj), for example I1(X0, Y0) corresponds to I2 (X0, Y0), I1 (X1, Y1) corresponds to I2 (X1, Y1), I1 (X1, Y0) corresponds to I2 (X1, Y0), and so on. In an example, a second alignment position may be determined by introducing at least an offset (for example, a threshold number of pixels in X and/or Y directions) in at least one of the images I1 and I2 with respect to the first alignment position. For example, in the second alignment position, I1(Xi+1, Yj) corresponds to I2 (Xi, Yj), as there is an offset of one pixel (in X direction) in the image I1. It should be noted that several different correspondences (i.e., alignment positions) may be determined based on offset (of at least one pixel in X and/or Y directions) in the images I1 and/or I2.

At 725, the method 700 includes determining a plurality of similarity values between the images I1 and I2 for the plurality of alignment positions for the images I1 and I2. At 730, the method 700 includes selecting an alignment position from among the plurality of alignment positions based on comparison of the plurality of similarity values. For example, for the selected alignment position, the similarity value may be maximum among the plurality of similarity values. An example of the operations performed at blocks 725 and 730 may be the operations performed by the example method 600 as described with reference to FIG. 6.

At 735, the method 700 includes generating a first scaled image ($I1_{S1}$) by scaling up the resolution of the first image I1 by a second factor. At 735, the method 700 also includes generating a second scaled image ($I2_{S1}$) by scaling up resolution of the second image I2 by the second factor. In an example, the second factor may be two, and the first scaled image $I1_{S1}$ and the second scaled image $I2_{S1}$ (each having resolution of 150*100) may be generated from up-scaling the resolutions of the first image I1 and the second image I2 (each having resolution of 75*50), respectively, by two.

At 740, the method 700 includes calculating directionality values for pixels of the image $I1_{S1}$ and directionality values for pixels of the image $I2_{S1}$. An example of the operation performed at block 740 may be the operations performed by the example method 400 as described with reference to FIG. 4.

At 745, the method 700 includes determining one or more alignment positions for the image $I1_{S1}$ and $I2_{S1}$ for calculating the similarity values between the images $I1_{S1}$ and $I2_{S1}$. In an example embodiment, the one or more alignment positions are determined based on the alignment position selected in a previous iteration (for example, for the images I1 and I2). For example, for the images $I1_{S1}$ and $I2_{S1}$ (of resolutions of 150*100), the one or more alignment positions may be determined based on the alignment position selected for the images I1 and I2. For example, the one or more alignment positions may be determined by introducing an offset in any of the images $I1_{S1}$ and $I2_{S1}$ (in X and/or Y directions) with respect to the alignment position for the images I1 and I2.

For example, if I1(Xi, Yj) corresponds to I2 (Xi+2, Yj+3) in the selected alignment position for the images I1 and I2, the one or more alignment positions for the $I1_{S1}$ and $I2_{S1}$ may be any offset by a threshold number of pixels in any of the $I1_{S1}$ or $I2_{S1}$. For instance, in an example, one or more alignment positions for the images $I1_{S1}$ and $I2_{S1}$ may be such that the $I1_{S1}(Xi, Yj)$ may correspond to $I2_{S1}$ $(Xi+2\pm\Delta, Yj+3\pm\Delta)$, where $\Delta$ may be zero, one or two pixels. Accordingly, there are five alignment positions selected for the $I1_{S1}$ and $I2_{S1}$, for example, $AP1_{S1}$, where $I1_{S1}(Xi, Yj)$ may correspond to $I2_{S1}(Xi+2, Yj+3)$; $AP2_{S1}$, where $I1_{S1}(Xi, Yj)$ may correspond to $I2_{S1}(Xi+3, Yj+4)$; $AP3_{S1}$, where $I1_{S1}(Xi, Yj)$ may correspond to $I2_{S1}(Xi+1, Yj+2)$; $AP4_{S1}$, where $I1_{S1}(Xi, Yj)$ may correspond to $I2_{S1}(Xi+4, Yj+5)$; and $AP5_{S1}$, where $I1_{S1}(Xi, Yj)$ may correspond to $I2_{S1}(Xi, Yj+1)$.

At 750, the method 700 includes determining a plurality of similarity values between the images $I1_{S1}$ and $I2_{s1}$ for the one or more alignment positions (for example, $AP1_{S1}$, $AP2_{S1}$, $AP3_{S1}$, $AP4_{S1}$ and $AP5_{S1}$). As already described, the similarity values for an alignment position (of $AP1_{S1}$, $AP2_{S1}$, $AP3_{S1}$, $AP4_{S1}$ and $AP5_{S1}$) are determined by performing bit-wise AND operation of the directionality values of the corresponding pixels of the images $I1_{S1}$ and $I2_{s1}$.

At 755, the method 700 includes selecting an alignment position from among the plurality of alignment positions for aligning the first scaled image and the second scaled image based on the plurality of similarity values between the first scaled image and the second scaled images. For example, the alignment position, for which the similarity value between the images $I1_{S1}$ and $I2_{S1}$ is maximum from among the plurality of similarity values, is selected as the alignment position for aligning the images $I1_{S1}$ and $I2_{s1}$.

At 760, it is checked whether the resolutions of the first scaled image $I1_{S1}$ and the second scaled image $I2_{s1}$ is equal to the resolutions of the first input image and the second input image. It the resolutions of the images $I1_{S1}$ and $I2_{s1}$ are not equal to the resolutions of the first input image and the second input image, the method 700 proceeds to 735. Further, the operations of the blocks 735 to 760 are performed. For instance, resolutions of the images $I1_{S1}$ and $I2_{s1}$ are upscaled by the second factor to generate a new first scaled image (for example, $I1_{S2}$) and a new second scaled image (for example, $I2_{s2}$). For example, the $I1_{S1}$ and $I2_{s1}$ (each having resolution of 150*100) are scaled by two to generate the images $I1_{S2}$ and $I2_{s2}$, each having resolution of 300*200.

In an example embodiment, at block 740, directionality values for the pixels of the images $I1_{S2}$ and $I2_{s2}$ (each having resolution of 300*200) are calculated. In an example embodiment, at block 745, one or more alignment positions are selected for calculating the similarity values between the images $I1_{S2}$ and $I2_{s2}$. As described in reference to FIG. 2, the one or more alignment positions are determined based on the alignment position selected for the images $I1_{S1}$ and $I2_{S1}$ in the immediately preceding iteration. In an example embodiment, at block 750, a plurality of similarity values are determined between the images $I1_{S2}$ and $I2_{s2}$ for the one or more alignment positions determined for the images $I1_{S2}$ and $I2_{s2}$. In an example embodiment, at block 755, an alignment position is selected from among the plurality of alignment positions for aligning the images $I1_{S2}$ and $I2_{s2}$.

Further, at block 760, it is checked whether the resolutions of the images $I1_{S2}$ and $I2_{s2}$ are equal to the resolutions of the first input image and the second input image. It should be noted that the operations of the blocks 735-760 are performed iteratively till the resolution of the upscaled images (at block 735) are equal to the resolutions of the first input image and the second input image. For example, in a next iteration, the apparatus 200 is caused to select an alignment position for $I1_{S3}$ and $I2_{s3}$ (each having resolutions of the 600*400), and thereafter, in a next iteration, the apparatus is further caused to select an alignment position for $I1_{S4}$ and $I2_{s4}$ (each having resolutions of the 1200*800), that is same as the first input image and the second input images.

If it is checked at block 760, that the resolutions of the scaled images in a current iteration are equal to the resolutions of the first input image and the second input image, it suggests that the alignment position for the first input image and the second input image has been selected. At block 765, the method 700 includes aligning the first input image and the second input image based on the selected alignment position.

It should be noted that to facilitate discussions of the flowcharts of FIGS. 4 to 7A-7B, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 400 to 700 are performed in an automated fashion. These operations involve substantially no interaction with the user. Other operations of the methods 400 to 700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to alignment of images. Various embodiments for alignment of images are exposure invariant as changing the exposure in images may only reduce the gradient difference, but direction of change in gradient remains same. Accordingly, for every pixel, the directionality value remains same and the images are aligned based on operations on the directionality values. The algorithm is inversion invariant (such as when lighted by a flash) as the sign of the gradient is disregarded. Therefore images with and without flash can be aligned well. Further, noise does not significantly affect the operations performed by various embodiments, as noise may introduce random errors in the directionality maps. These errors do not reward one alignment over another but simply attenuates the similarity measurement signal. Further, regions of images without texture or the regions that are over-exposed or under-exposed in one image (but not the other image) is automatically disregarded in the alignment algorithm, as these areas are assigned directionality value zero which become non-zero while performing a bit-wise binary AND operation. This may be applicable in aligning HDR images. In various scenarios, weak textures can also be used to align the images as only the direction of the texture is used and not its contrast. Further, images with moving objects are aligned well as long as the moving objects do not cover more than significant part of images (for example, half of the area of the images). This is due to the fact that the similarity value measurement is proportional to the matching image surface area between images. As such, the alignment methods would align in such a way as to maximize the matching surface given the same texture properties. In various embodiments, due to the simple operations performed on each pixel of the images, the implementation of the algorithm is extremely fast, when executed. Various embodiments also offers robustness by having an algorithm that is efficient enough that it can be run on each pixel thus creating a much higher statistical probability of success in weak signals.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

I claim:

1. A method, comprising:
    calculating directionality values for pixels of a first image and for pixels of a second image, wherein a directionality value for a pixel is calculated based on gradient differences between the pixel and a plurality of neighboring pixels;
    determining a plurality of similarity values between the first image and the second image for a plurality of alignment positions of the first image and the second image, wherein similarity value for an alignment position is determined based at least on the directionality values for the pixels of the first image and the directionality values for corresponding pixels of the second image associated with the alignment position of the first image and the second image; and
    selecting an alignment position from among the plurality of alignment positions for aligning the first image and the second image based on comparison of the plurality of similarity values.

2. The method as claimed in claim 1, wherein calculating the directionality value for pixel comprises:
    calculating a plurality of gradient differences between the pixel and the plurality of neighboring pixels;
    selecting a neighboring pixel from among the plurality of neighboring pixels based on a comparison of the plurality of gradient differences; and
    assigning the directionality value for the pixel based on a direction of the neighboring pixel with respect to the pixel.

3. The method as claimed in claim 2, wherein the directionality value for any given pixel is zero if there is no gradient difference between the given pixel and the corresponding plurality of neighboring pixels.

4. The method as claimed in claim 2, wherein selecting the neighboring pixel comprises determining the neighboring pixel associated with a highest gradient difference among the plurality of gradient differences.

5. The method as claimed in claim 1, wherein the alignment position comprises a maximum similarity value between the first image and the second image from among the plurality of similarity values.

6. The method as claimed in claim 1, further comprising:
    receiving a first input image and a second input image for alignment of the first input image and the second input image;
    generating the first image by downscaling a resolution of the first input image by a first factor; and
    generating the second image by downscaling a resolution of the second input image by the first factor.

7. The method as claimed in claim 1, further comprising aligning the first image and the second image by the alignment position for the first image and the second image.

8. An apparatus comprising:
    at least one processor; and
    at least one memory comprising computer program code, the at least one memory and the computer program code configured to, with the at least one processor, cause the apparatus to at least perform:
        calculate directionality values for pixels of a first image and for pixels of a second, wherein a directionality value for a pixel is calculated based on gradient differences between the pixel and a plurality of neighboring pixels;

determine a plurality of similarity values between the first image and the second images for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and select an alignment position from among the plurality of alignment positions for aligning the first image and the second image based on comparison of the plurality of similarity values.

9. The apparatus as claimed in claim 8, wherein for calculating the directionality value for the pixel, the apparatus is further caused, at least in part to:

calculate a plurality of gradient differences between the pixel and the plurality of neighboring pixels;

select a neighboring pixel from among the plurality of neighboring pixels based on a comparison of the plurality of gradient differences; and assig the directionality value for the pixel based on a direction of the neighboring pixel with respect to the pixel.

10. The apparatus as claimed in claim 9, wherein the directionality value for any given pixel is zero if there is no gradient difference between the given pixel and the corresponding plurality of neighboring pixels.

11. The apparatus as claimed in claim 9, wherein for selecting the neighboring pixel, the apparatus is further caused, at least in part to determine the neighboring pixel associated with a highest gradient difference among the plurality of gradient differences.

12. The apparatus as claimed in the claim 8, wherein the alignment comprises a maximum similarity value between the first image and the second image from among the plurality of similarity values.

13. The apparatus as claimed in the claim 8, wherein the apparatus is further caused, at least in part to:

receive a first input image and a second input image for alignment of the first input image and the second input image;

generate the first image by downscaling a resolution of the first input image by a first factor; and generate the second image by downscaling a resolution of the second input image by the first factor.

14. The apparatus as claimed in the claim 8, wherein the apparatus is further caused, at least in part to align the first image and the second image by the alignment position for the first image and the second image.

15. A computer program product comprising at least one non-transitory computer-readable storage medium, the non-transitory computer-readable storage medium comprising a set of instructions, which, when executed by one or more processors, cause an apparatus to at least perform:

calculate directionality values for pixels of a first image and for pixels of a second image, wherein a directionality value for a pixel is calculated based on gradient differences between the pixel and a plurality of neighboring pixels of the pixel of the first image;

determine a plurality of similarity values between the first image and the second image for a plurality of alignment positions of the first image and the second image, wherein a similarity value for an alignment position is determined based at least on the directionality values for the pixels of the first image and the directionality values for corresponding pixels of the second image associated with the alignment position of the first image and the second image; and select an alignment position from among the plurality of alignment positions for aligning the first image and the second image based on comparison of the plurality of similarity values.

16. The computer program product as claimed in claim 15, wherein for calculating the directionality value for the pixel, the apparatus is further caused, at least in part to:

calculate a plurality of gradient differences between the pixel and the plurality of neighboring pixels;

select a neighboring pixel from among the plurality of neighboring pixels based on a comparison of the plurality of gradient differences; and assign the directionality value for the pixel based on a direction of the selected neighboring pixel with respect to the pixel.

17. The computer program product as claimed in claim 16, wherein the directionality value for any given pixel is zero if there is no gradient difference between the given pixel and the plurality of neighboring pixels.

18. The computer program product as claimed in claim 16, wherein for selecting the neighboring pixel, the apparatus is further caused, at least in part to: determine the neighboring pixel associated with a highest gradient difference among the plurality of gradient differences.

19. The computer program product as claimed in claim 15, wherein the alignment position comprises a maximum similarity value between the first image and the second image from among the plurality of similarity values.

20. The computer program product as claimed in claim 15, wherein the apparatus is further caused, at least in part to:

receive a first input image and a second input image for alignment of the first input image and the second input image;

generate the first image by downscaling a resolution of the first input image by a first factor; and generate the second image by downscaling a resolution of the second input image by the first factor.

21. The computer program product as claimed in claim 15, wherein the apparatus is further caused, at least in part to align the first image and the second image by the alignment position for the first image and the second image.

* * * * *